United States Patent [19]

Beery

[11] Patent Number: 4,802,633
[45] Date of Patent: Feb. 7, 1989

[54] MOVABLE CARTRIDGE LOCK

[75] Inventor: Jack Beery, Centerville, Ohio

[73] Assignee: The Mead Corporation, Dayton, Ohio

[21] Appl. No.: 209,714

[22] Filed: Jun. 22, 1988

[51] Int. Cl.$^4$ .................. G03B 17/26; B65D 85/66
[52] U.S. Cl. .................. 242/71.1; 242/71.7; 354/275; 354/277; 206/389
[58] Field of Search .................. 242/71, 71.1, 71.7, 242/55.53, 197, 198, 71.8; 352/72, 78 R; 354/275, 277; 206/53, 316, 389, 409

[56] References Cited

U.S. PATENT DOCUMENTS

| | | | |
|---|---|---|---|
| 3,613,876 | 10/1971 | Kohler et al. | 206/387 |
| 3,784,001 | 1/1974 | Bushnell et al. | 206/316 |
| 3,807,840 | 4/1974 | Cook et al. | 352/72 |
| 4,394,989 | 7/1983 | Moris | 242/55.19 A |
| 4,403,845 | 9/1983 | Bulens et al. | 354/275 |
| 4,513,928 | 4/1985 | Hackett | 242/198 |
| 4,553,717 | 11/1985 | Takagi | 242/198 |
| 4,572,461 | 2/1986 | Horikawa et al. | 242/198 |
| 4,605,325 | 8/1986 | Hofmann | 400/207 |
| 4,638,393 | 1/1987 | Oishi et al. | 360/132 |
| 4,679,110 | 7/1987 | Schoettle et al. | 360/132 |
| 4,703,384 | 10/1987 | Kawada et al. | 360/132 |
| 4,719,529 | 1/1988 | Oishi et al. | 360/132 |

Primary Examiner—David Werner
Attorney, Agent, or Firm—Biebel, French & Nauman

[57] ABSTRACT

The spool of a cartridge or cassette of web material is locked against rotation during shipping and handling by a "one-shot" locking member which has a fixed portion and a movable portion joined along a bendable connection. The movable portion is in engagement with the spool while the movable portion is mounted on the body of the cartridge. The locking member is released by bending the movable portion about the connection and stressing the material of the connection beyond its elastic limit. In one embodiment the locking member has a sector gear portion on its movable end normally engaged with a bull gear on the spool. In a second embodiment, the leaf-like locking member has a partially cut-out fixed portion intermediate its ends, joined to the member by a bendable hinge, and has ratchet teeth which engage ratchet teeth on the spool, permitting the spool to be rotated in only one direction while the locking member is engaged. A protuberance on the locking member extends into a pin access opening as a light seal and as a push surface for an operating pin. A frangible connection secures the movable portion in place and is broken during release and requires a higher initial force to disengage the locking member from its locking position than that required to bend the locking member about the hinge.

14 Claims, 3 Drawing Sheets

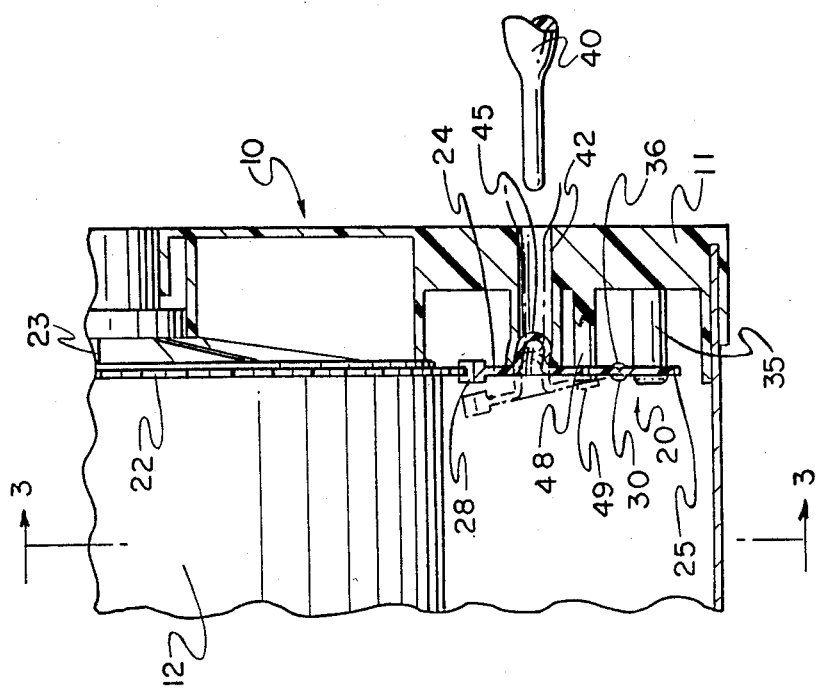
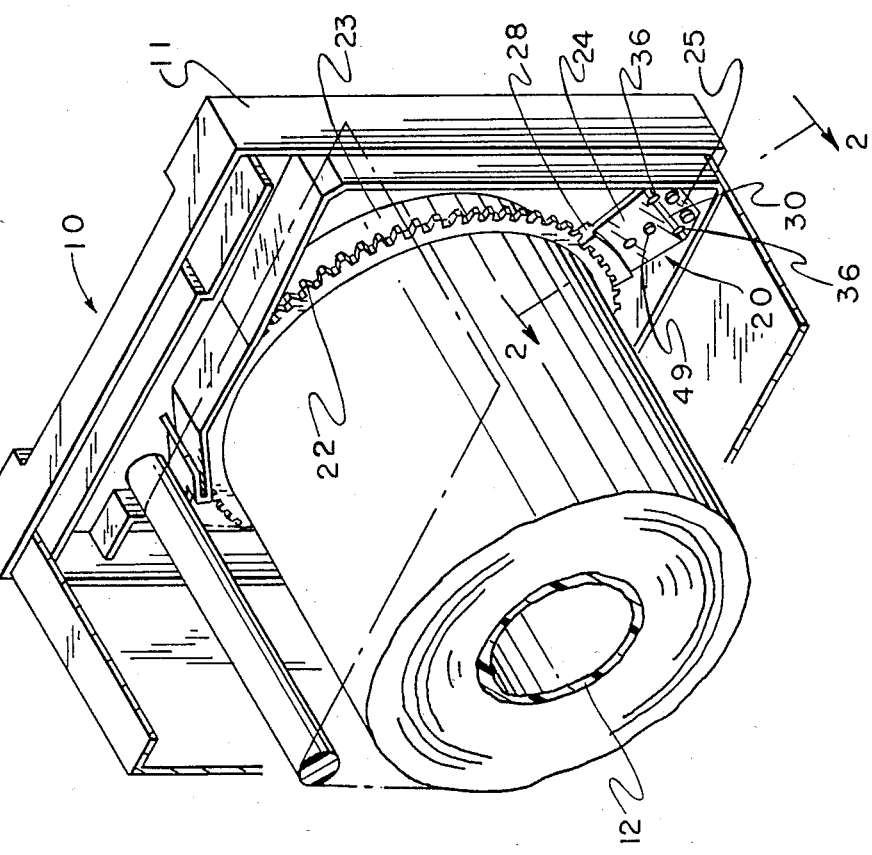

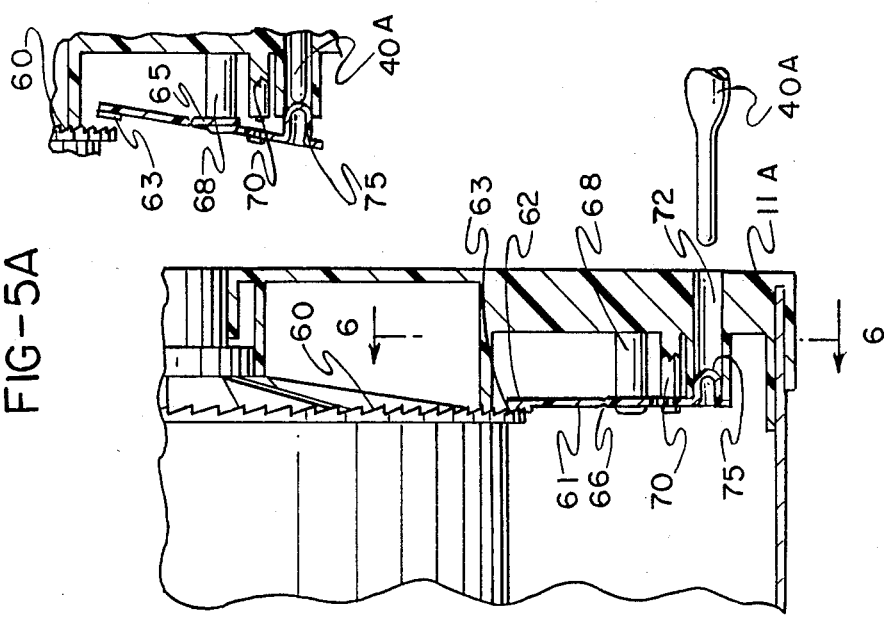
FIG-5A
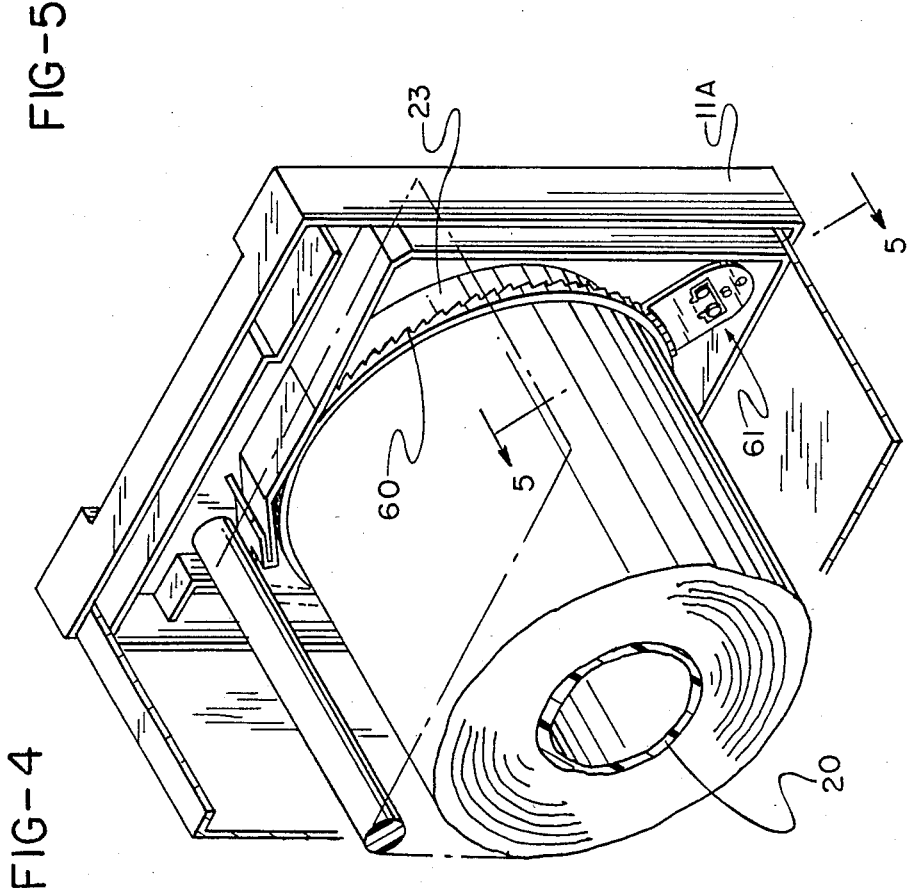
FIG-5
FIG-4

MOVABLE CARTRIDGE LOCK

BACKGROUND OF THE INVENTION

This invention relates to spool-type cartridges or cassettes, and more particularly to such cartridges or cassettes for spooled web material, such as photosensitive material or recording media in web form. The invention is more particularly directed to a low cost and effective single-use spool locking arrangement by which one or more of the spools of web material are positively retained against rotation during shipping and handling, which lock is released when the cartridge or cassette is inserted into a suitable utilization apparatus.

Spool locks for spools of web material in cartridges and/or cassettes have generally been of two types. A first type consists of a reusable or two way lock. Such locks commonly have a pivotally mounted latch member which is movable out of engagement with the spool when the cartridge or cassette is inserted into the utilization apparatus, as by the interengagement of an operating member on the using equipment. Normally a spring, or other return mechanism, cause re-engagement of the latch member hen the cartridge or cassette is removed from the equipment. Such retaining mechanisms are usually relatively costly and complicated and are more commonly employed with reusable two spool cassettes.

A second spool lock consists of the "one-shot" or single use frangible connection between the spool and the body of a single-use cartridge. A sufficiently high withdrawal tension on the web material, transmitted by the spool to the connection, causes the failure of the connection. These arrangements are not unlike a fuse, in that they must lock the spool with sufficient force to resist anticipate loads during transit and the like, but must also be dependably breakable to provide for the paying out or withdrawal of the web under normal handling tensions. The design of such frangible connections requires a careful balance between holding torques and ease of release by web withdrawal.

A further disadvantage of releasable or frangible cartridge spool retainers is that they have been generally designed for retaining relatively light-weight reels and spools, and such compromise between holding force and ease of release is more difficult to make with spools that have a large inertia. Therefore, such designs are not well suited for the securing of relatively heavier rolls of web type media material.

A need exists for a low cost and dependable single retention of the spool during handling, which may be readily and fully removed from service when desired, and which does not involve critically designed components.

SUMMARY OF THE INVENTION

This invention relates to a spool type cartridge and more particularly to such a cartridge incorporating a single-use or "one shot" spool lock or retaining mechanism. As used herein, the term "cartridge" is intended to be generic to spool-housing or retaining containers of the single spool type, of the two-spool type, more commonly called "cassettes".

The retaining mechanism of this invention employs a locking portion or locking member which, in an original position, is in locking engagement with a portion of the spool. The locking member is connected to a fixed part of the cartridge through a bendable connection or joint formed of material which has an elastic limit which is, by design, exceeded by bending along the joint. The locking member is relatively rigid in the direction of rotation of the spool.

In the preferred embodiments, the locking member is in the form of a generally flat leaf-like body, one end of which interengages a peripheral part of the spool along a substantial circumference thereof, and presents a high beam strength which resists forces tending to cause the spool to rotate. Another part of the flat member is joined to the cartridge along a bendable hinge or connection. The connection permits disengaging movement of the locking member in a direction generally perpendicular to the direction of its greatest beam strength.

The locking member is adapted to be released or otherwise moved, preferably during the insertion of the cartridge into its using equipment, by an external operating member, such as a pin or the like. In one preferred embodiment, the locking member forms part of a gear sector, the teeth of which are normally engaged with the teeth of a bull gear portion of the spool, holding the spool against rotation. Movement of the member about the bendable connection or hinge causes the teeth of the sector to become disengaged from the those of the spool and permits free turning of the spool. Such movement permanently deforms the material at the hinge or joint, thereby preventing re-engagement of the locking member.

As a further refinement, the interengaging portions of the spool and locking member form ratchet teeth which are beveled or tapered, so as to permit rotation of the spool in one directly only, prior to the disabling of the locking member. Also the connection of the locking member may be designed such that one force is required to break the connection, and a second, substantially lower, force is required to complete the bending. Such an arrangement may include a frangible link or pin which secures the locking member in engagement with the spool, which link is broken to release the locking member for unlatching movement. This may be a preferred embodiment where high shock forces perpendicular to the roll axis may be encountered prior to use.

The bendable connection may be made of the same material as that of the remainder of the locking member and the cartridge. In fact, a locking tab may be molded in place, or added as a separate part by ultrasonic welding. Thus it may be an integral part of the cartridge structure, formed during the molding of the cartridge parts. While the pitch lines of the retention sector and the gear are normally inline, the locking member may be arranged so that it is moved either inwardly or outwardly with respect to the interior of the cartridge.

The bendable connection for the joint may take the form of a integral polymer hinge connection which incorporates one or more thickened or raised portions. These portions provide rigidity to the hinge, and are designed to be overstressed during disengaging movement of the locking member or tab.

An advantage of the cartridge lock of this invention is that it may be configured for operation by some means external to the cartridge itself, and yet provide an effective light seal while in the operative or spool restraining position. A light seal may take the form of a protuberance on the member normally extending into light blocking relation with an operator pin access opening, forming a push surface for the pin.

A further advantage of the invention is that it provides an effective and low cost spool retainer for retaining relatively large and heavy spools of media material in web form, such as the donor or receiver media material made in accordance with the teachings of the commonly-assigned U.S. Pat. Nos. 4,440,846 and 4,399,209.

It is therefore an important object of the invention to provide a single use cartridge lock which is disabled with the insertion of the cartridge into its utilization apparatus.

Another object of the invention is the provision of a spool or reel lock for a cartridge, in which a bendable hinge connection is stressed beyond the elastic limits of the material, in use.

A further object of the invention is the provision of a spool retainer for a cartridge which is positive in operation and low in cost.

A still further object is the provision of a cartridge, as outlined above, in which a spool retainer has high beam strength in the direction resisting rotation of the spool, and which is readily movable in a transverse direction, about a bendable connection, to release the spool.

A more particular object of the invention is the provision of a cartridge for the handling and delivery of relatively heavy spools of media material, in which the spool is effectively restrained prior to insertion into utilization equipment. A reel or spool lock may restrict rotation in either direction, or may permit ratcheted rotation in one direct only. The locking member may also provide an effective light seal prior to use.

These and other objects and advantages of the invention will be apparent from the following description, the accompanying drawings and the appended claims.

BRIEF DESCRIPTION OF THE DRAWINGS

FIG. 1 is a perspective view, partially broken away, of a cartridge having a spool lock in accordance with one embodiment of the invention;

FIG. 2 is a vertical, enlarged, fragmentary section through the cartridge and lock of FIG. 1, and also showing the relative position of an operating pin in utilization apparatus, looking generally along the view line 2—2 of FIG. 1;

FIG. 4 is a view similar to FIG. 1 of a modified form of the invention;

FIG. 5 is a sectional view similar to FIG. 2 showing the embodiment of FIG. 4 and taken along line 5—5 of FIG. 4;

FIG. 5A is a detail of FIG. 5 showing the latch member in an operated or moved position;

DESCRIPTION OF PREFERRED EMBODIMENTS

Figure 3:
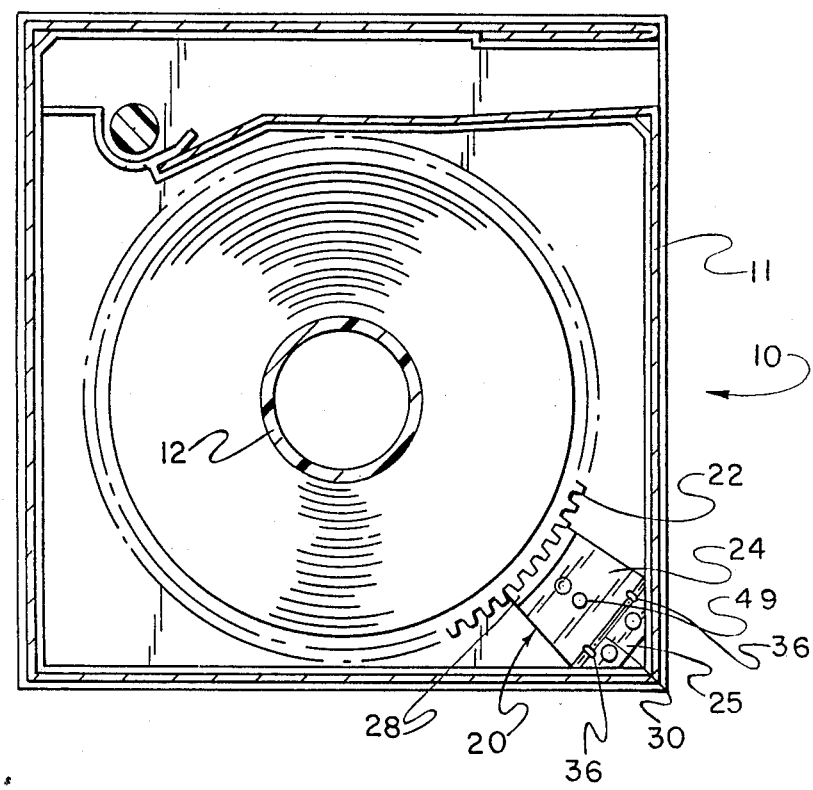
FIG. 3 is a sectional view through the cartridge looking generally along the line 3—3 of FIG. 2.

Referring to the drawings, which illustrate preferred embodiments of the invention, a spool-type cartridge embodying the locking structure according to one preferred embodiment of this invention is shown at 10. The cartridge is an expendable item and, as such, it is shipped separately from the utilization device. Also, it will commonly be shipped in large quantities with other cartridges.

The cartridge has a body 11 upon or within which is rotatably mounted a spool 12 of wound web material. The material of the web may be extracted from the cartridge, when the cartridge is placed in suitable utilization apparatus, such as a copier or printer. The spool 12 is locked against rotation during shipping and handling, prior to use, by a spool latching or locking member shown generally at 20 in FIGS. 1 and 2. The locking member cooperates with suitable means associated with the spool and rotatable with the spool, in the form of a drum or bull gear 22 formed on the periphery of one of the spool end caps 23.

The locking member 20 has a first or movable flat or leaf-like locking portion 24 which is movable into and out of engagement with the gear 22, and further includes a second flat part in the form of a relatively fixed portion 25 rigidly mounted on the body of the spool 10. The movable portion 24 is provided, at one end, with gear teeth 28 in the form of a gear sector. The teeth 28 have a pitch line in common with that of the gear 22, and are normally held or positioned in engagement with the teeth of the gear 22.

The movable portion 24 and the fixed portion 25 are integrally joined by and along a common integral bendable connection or hinge 30. As shown in FIG. 2, the connection 30 may be in the form of a transversely thinned or weakened section or line, forming an elongated bend axis about which the portion 24 may move to carry the sector teeth 28 out of locking engagement with the gear 22.

One end of the fixed portions of the latch member 20 is firmly attached to the cartridge 10, on the ends of a pair of upstanding rigid posts 35. The bases of the posts are mounted on, or form an integral part of, the body 11. The bendable hinge 30 is therefore located between the fixed end, defined at the posts 35, and the movable portion 24.

The hinge 30 may be reinforced by one or more small raised portions or ribs 36 on the hinge line. These ribs, during bending movement of the movable portion 24 about the hinge 30, are stressed beyond the elastic limit of the material, and thus become permanently deformed. It will be noted that the hinge 30 provides high beam strength in the direction of possible rotation of the spool 12, due to the fact that the locking portion 24, in the long direction of the hinge, is wide compared to the thickness of the material at the hinge. Forces tending to rotate the spool are transmitted though the body of the locking member 20 to the fixed support posts 35.

Means are provided for disengaging the movable portion 24 of the locking member 20 from the spool 12 when the cartridge is placed in use. Preferable, this means is incorporated in, or otherwise forms part of the utilization apparatus for the cartridge, and may consist of a simple push pin 40. An access opening 42 (FIG. 2) in the body 11 of the cartridge is aligned, when the cartridge is inserted or loaded, with the path of movement of the pin 40, as shown in FIG. 2. The opening 42 leads to a location or region on the movable portion 24 about midway between the hinge 30 and the sector teeth 28, to provide good mechanical advantage for the ease of disabling the latch.

The movable portion 24 may be provided with light sealing means in the form of a protuberance or cup-shaped portion 45 (FIG. 2), proportioned to be tightly received in closing relation to the inside end of the opening 42. The protuberance, at the outer surface thereof, forms a contact surface for the end of the pin 40. The light seal formed by the protuberance need only be effective prior to the insertion of the cartridge into the using machine, and is no longer needed once the cartridge is properly in place.

As previously noted, it may be desirable to provide the latching member with an initially high resistance to the disengaging movement, followed thereafter by lower resistance to movement. This is accomplished by a frangible tie down or a fuse-like connection between the body of the cartridge and the movable portion 24 of the locking structure. The connection offers an initially high resistance to breaking, and after being broken, permits the entire force of the pin 40 to be effective in bending the portion 24 about the hinge connection 30.

Such a tie down is shown in FIG. 2, as a relatively weakened connecting pin or link 48. One end of the link 48 is connected to the body of the cartridge, and the other end is connected to the portion 24. The link head 49 may fail and be withdrawn through the portion 24, or the link may be weakened just under the head 49 so as to fail under a predetermined stress. In either case, the link 48 provides means for retaining the locking member in an operative position with a force which exceeds that required thereafter to move the member to an inoperative or release position.

The operation of the embodiment of FIGS. 1-3 is self-evident from the forgoing description. The latching member may be formed of the same material as that of the cartridge body. The fixed portion 25 may be ultrasonically welded or otherwise attached to the body, on the support pins 35. The utilization apparatus for the cartridge may itself provide the releasing mechanism, in the form of the pin 40. Alternatively, the protuberance 45 forming the light shield may be provided with an elongated operator or pin portion, extending out to the exterior surface of the cartridge body, or beyond, for external access and operation.

When sufficient force is applied to the protuberance 45, the frangible connection formed by the link 48 to the movable latch portion 24 is broken, and the portion will pivot about the integral hinge 30, and the teeth 28 will become disengaged from the gear 22. The material of the hinge, especially the material of the ribs 36, will be stressed beyond the elastic limit and thus permanently deformed, so that the teeth 28 on the sector end remain disengaged. This moved position is shown by the broken lines in FIG. 2. The latch mechanism may be arranged so that the moving latch portion bends inwardly or outwardly with respect to the cartridge, as desired. Even though the latch is now disabled, the movable portion remains attached to its fixed support portion 25, and is not free to become disengaged and interfere with the proper operation of the cartridge.

Figure 6:
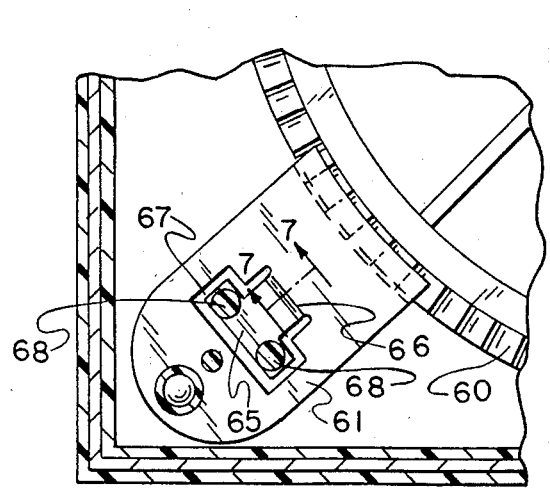
FIG. 6 is an enlarged fragmentary detail of the embodiment of FIG. 4 looking along line 6—6 of FIG. 5.
Figure 7:
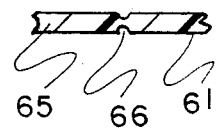
FIG. 7 is a fragmentary sectional view through the hinge looking generally along the line 7—7 of FIG. 6.

FIGS. 4-7 illustrate a second preferred embodiment of the invention, in which the teeth of the latch member are arranged to permit the spool to turn in one direction only. In the embodiment of FIGS. 4-6, the spool 12 may turn anti-clockwise, as viewed in FIG. 4, to retract the web material into the cartridge, but is restrained from turning clockwise and thus prevents the web material to be withdrawn from the cartridge. For the purpose, the periphery of the spool wall of the end cap 23 is formed with an annular array of inclined ratchet teeth 60. The teeth are shown as facing axially of the spool 12. The locking member 61 is formed with a movable sector portion 62, the remote end of which is formed with corresponding ratchet teeth 63 which mesh with those of the spool. The teeth 63 are biased by the latch support into engagement with the spool. Spool rotation in the ratcheting direction is accomplished by limited deflection of the movable latch member 61.

The latch member of this embodiment is formed with an integral leaf or tongue 65 attached to the remainder of the member only along a hinge 66 (FIG. 7), and otherwise cut out of the member 61 and forming a generally U-shaped clearance 67 with the member 61. The body of the latch can effectively rock about the tongue 65 by bending at the hinge 66.

The leaf is rigidly attached to the cartridge body 11A on a pair of support posts 68. A fuse or frangible line or connection 70, similar in function to the link head 49 of the preceding embodiment, retains the latching member 61 in its latching position until a predetermined force is applied by a push pin 40A through an operating access opening 72. The latch member may also be formed with a light-sealing protuberance 75, having the same general configuration and function as the protuberance 45 above, and thus forms a bearing surface for the end of the pin 40A.

The operation of this embodiment is similar to that previously described. The pin 40A, which may be part of the cartridge utilization apparatus, engages the light seal and protuberance 75 with sufficient force to break the connection with the link 7 and cause the latch member 61 to rock about the hinge 66 at the leaf 65, as shown in FIG. 5A. The material of the hinge 66 is stressed beyond its elastic limit, resulting in the disengagement of the latch ratchet teeth with those of the spool cap, with a rocking movement of the latch member on the leaf sufficient to prevent subsequent reengagement.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a spool type cartridge containing at least one spool of web material, which material may be readily extracted when the cartridge is placed in utilization apparatus, and which spool is locked against rotation during shipping and handling prior to insertion in such utilization apparatus, the improvement in spool locking structure, comprising:

means associated with said spool and connected for rotation therewith defining a locking portion, a locking member having a relatively fixed portion and a locking portion movable into and out of engagement with said spool locking portion, means on said locking member defining a bendable connection joining said movable locking portion with said fixed portion and normally maintaining said movable portion in locking engagement with said spool, said locking member being movable on said fixed portion by bending movement of said connection beyond the elastic limit of the material of said connection, and means operable upon the placement of said cartridge in said utilization apparatus to disengage said locking member from said spool accompanied by said bending at said connection providing for a permanent disengagement of said member.

2. The cartridge of claim 1 in which the force required to disengage said locking member is initially higher that the force required to bend said connection beyond said elastic limit.

3. The cartridge of claim 1 in which said connection is an integral hinge of a plastic polymer.

4. The cartridge of claim 1 in which said spool locking portion is a bull gear, and said movable portion forms a gear sector in normally mating engagement with a peripheral portion of said bull gear.

5. The cartridge of claim 1 in which said spool and locking member include interfitting ratchet teeth providing rotation of said spool in one direction only when said movable portion of said locking member is engaged.

6. The cartridge of claim 1 further comprising a frangible link connecting said movable portion with said cartridge and breakable upon initial disengaging movement of said locking member.

7. The cartridge of claim 1 further comprising means in said cartridge body defining a aperture adjacent said locking member, and means on said locking member movable portion normally closing said aperture to prevent light from entering said cartridge.

8. The cartridge of claim 7 in which said last named means comprising a protuberance normally extending into light blocking relation with said aperture, said protuberance having an outer exposed surface at said aperture providing a contact surface for a locking member operating pin inserted through said aperture.

9. In a spool-type cartridge having a body containing at least one spool of web material which material may be readily extracted therefrom when the cartridge is placed in utilization apparatus, and which spool is locked against rotation during shipping and handling prior to insertion in such utilization apparatus, the improvement in spool locking structure, comprising:

means associated with said spool and connected for rotation therewith defining a spool locking portion, a locking member having a relatively fixed portion on said cartridge body adjacent said spool and having a movable second locking portion having locking means thereon movable into and out of engagement with said spool locking portion, means defining an integral bendable hinge joining said movable locking portion with said fixed portion and normally maintaining said locking member engaged with said first spool, said locking member being movable by bending movement about said hinge beyond the elastic limit of the material of said hinge to disengage said movable locking portion from said spool.

10. The cartridge of claim 9 in which the force required to move said locking member on said hinge is initially higher that the force required to bend said connection beyond said elastic limit.

11. The cartridge of claim 10 further comprising a frangible connection retaining said movable portion in a fixed position until broken.

12. The cartridge of claim 11 in which said frangible connection is a pin having a base connected to said body and a head connected to said member.

13. The cartridge of claim 9 further comprising means in said body defining an operator pin access opening, and means on said locking portion normally in light blocking relation to said opening.

14. The cartridge of claim 13 in which said last named means is a protuberance integrally formed on said movable portion and extending into said opening.

* * * * *